United States Patent
Xing

(10) Patent No.: US 9,639,580 B1
(45) Date of Patent: May 2, 2017

(54) COMPUTER-IMPLEMENTED SYSTEMS AND METHODS FOR DATA MANAGEMENT AND VISUALIZATION

(71) Applicant: PALANTIR TECHNOLOGIES INC., Palo Alto, CA (US)

(72) Inventor: Yichen Xing, Potomac, MD (US)

(73) Assignee: PALANTIR TECHNOLOGIES, INC., Palo Alto, CA (US)

( * ) Notice: Subject to any disclaimer, the term of this patent is extended or adjusted under 35 U.S.C. 154(b) by 0 days.

(21) Appl. No.: 14/929,584

(22) Filed: Nov. 2, 2015

Related U.S. Application Data

(60) Provisional application No. 62/214,840, filed on Sep. 4, 2015.

(51) Int. Cl.
  *G06F 17/00* (2006.01)
  *G06F 17/30* (2006.01)
  *G06F 3/0484* (2013.01)

(52) U.S. Cl.
  CPC ...... *G06F 17/3053* (2013.01); *G06F 3/04842* (2013.01); *G06F 17/30061* (2013.01)

(58) Field of Classification Search
  CPC .......... G06F 17/3053; G06F 17/30241; G06F 17/30867; G06F 17/30876; G06F 3/0689
  See application file for complete search history.

(56) References Cited

U.S. PATENT DOCUMENTS

| | | |
|---|---|---|
| 4,899,161 A | 2/1990 | Morin et al. |
| 4,958,305 A | 9/1990 | Piazza |
| 5,329,108 A | 7/1994 | Lamoure |
| 5,754,182 A | 5/1998 | Kobayashi |
| 5,781,195 A | 7/1998 | Marvin |
| 5,781,704 A | 7/1998 | Rossmo |
| 6,091,956 A | 7/2000 | Hollenberg |
| 6,157,747 A | 12/2000 | Szeliski et al. |
| 6,169,552 B1 | 1/2001 | Endo et al. |
| 6,173,067 B1 | 1/2001 | Payton et al. |

(Continued)

FOREIGN PATENT DOCUMENTS

| | | |
|---|---|---|
| AU | 2012216622 | 5/2015 |
| CN | 102546446 | 7/2012 |

(Continued)

OTHER PUBLICATIONS

"A First Look: Predicting Market Demand for Food Retail using a Huff Analysis," TRF Policy Solutions, Jul. 2012, pp. 30.

(Continued)

*Primary Examiner* — Truong Vo
(74) *Attorney, Agent, or Firm* — Finnegan, Henderson, Farabow, Garrett & Dunner, LLP

(57) ABSTRACT

Systems and methods are disclosed for data management and visualization. In accordance with one implementation, a method is provided that includes, for example, receiving data from one or more sources, the data being associated with a plurality of locations. The method also includes receiving, based on input from a user, a selection of a set of metrics for scoring each of the plurality of locations and a weight to assign to each metric. In addition, the method includes calculating an overall score for each of the plurality of locations based on the received data, the selected set of metrics, and the weight assigned to each metric.

19 Claims, 4 Drawing Sheets

(56) References Cited

U.S. PATENT DOCUMENTS

| | | |
|---|---|---|
| 6,178,432 B1 | 1/2001 | Cook et al. |
| 6,247,019 B1 | 6/2001 | Davies |
| 6,389,289 B1 | 5/2002 | Voce et al. |
| 6,414,683 B1 | 7/2002 | Gueziec |
| 6,430,305 B1 | 8/2002 | Decker |
| 6,483,509 B1 | 11/2002 | Rabenhorst |
| 6,529,900 B1 | 3/2003 | Patterson et al. |
| 6,631,496 B1 | 10/2003 | Li et al. |
| 6,662,103 B1 | 12/2003 | Skolnick et al. |
| 6,757,445 B1 | 6/2004 | Knopp |
| 6,820,135 B1 | 11/2004 | Dingman |
| 6,828,920 B2 | 12/2004 | Owen et al. |
| 6,978,419 B1 | 12/2005 | Kantrowitz |
| 6,980,984 B1 | 12/2005 | Huffman et al. |
| 6,983,203 B1 | 1/2006 | Wako |
| 6,985,950 B1 | 1/2006 | Hanson et al. |
| 7,036,085 B2 | 4/2006 | Barros |
| 7,158,878 B2 | 1/2007 | Rasmussen et al. |
| 7,168,039 B2 | 1/2007 | Bertram |
| 7,375,732 B2 | 5/2008 | Arcas |
| 7,379,811 B2 | 5/2008 | Rasmussen et al. |
| 7,457,706 B2 | 11/2008 | Malero et al. |
| 7,461,077 B1 | 12/2008 | Greenwood |
| 7,502,786 B2 | 3/2009 | Liu et al. |
| 7,519,470 B2 | 4/2009 | Brasche et al. |
| 7,529,195 B2 | 5/2009 | Gorman |
| 7,539,666 B2 | 5/2009 | Ashworth et al. |
| 7,558,677 B2 | 7/2009 | Jones |
| 7,574,428 B2 | 8/2009 | Leiserowitz et al. |
| 7,579,965 B2 | 8/2009 | Bucholz |
| 7,617,232 B2 | 11/2009 | Gabbert et al. |
| 7,617,314 B1 | 11/2009 | Bansod et al. |
| 7,620,628 B2 | 11/2009 | Kapur et al. |
| 7,663,621 B1 | 2/2010 | Allen et al. |
| 7,756,843 B1 | 7/2010 | Palmer |
| 7,791,616 B2 | 9/2010 | Ioup et al. |
| 7,805,457 B1 | 9/2010 | Viola et al. |
| 7,809,703 B2 | 10/2010 | Balabhadrapatruni et al. |
| 7,872,647 B2 | 1/2011 | Mayer et al. |
| 7,894,984 B2 | 2/2011 | Rasmussen et al. |
| 7,899,611 B2 | 3/2011 | Downs et al. |
| 7,899,796 B1 | 3/2011 | Borthwick et al. |
| 7,917,376 B2 | 3/2011 | Bellin et al. |
| 7,920,963 B2 | 4/2011 | Jouline et al. |
| 7,941,321 B2 | 5/2011 | Greenstein et al. |
| 7,945,852 B1 | 5/2011 | Pilskains |
| 7,962,281 B2 | 6/2011 | Rasmussen et al. |
| 7,970,240 B1 | 6/2011 | Chao et al. |
| 8,010,545 B2 | 8/2011 | Stefik et al. |
| 8,036,632 B1 | 10/2011 | Cona et al. |
| 8,036,971 B2 | 10/2011 | Aymeloglu et al. |
| 8,037,046 B2 | 10/2011 | Udezue et al. |
| 8,046,283 B2 | 10/2011 | Burns |
| 8,054,756 B2 | 11/2011 | Chand et al. |
| 8,065,080 B2 | 11/2011 | Koch |
| 8,085,268 B2 | 12/2011 | Carrino et al. |
| 8,134,457 B2 | 3/2012 | Velipasalar et al. |
| 8,145,703 B2 | 3/2012 | Frishert et al. |
| 8,200,676 B2 | 6/2012 | Frank |
| 8,214,361 B1 | 7/2012 | Sandler et al. |
| 8,214,490 B1 | 7/2012 | Vos et al. |
| 8,214,764 B2 | 7/2012 | Gemmell et al. |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,290,838 B1 | 10/2012 | Thakur et al. |
| 8,290,942 B2 | 10/2012 | Jones et al. |
| 8,290,943 B2 | 10/2012 | Carbone et al. |
| 8,301,464 B1 | 10/2012 | Cave et al. |
| 8,302,855 B2 | 11/2012 | Ma et al. |
| 8,325,178 B1 | 12/2012 | Doyle, Jr. |
| 8,368,695 B2 | 2/2013 | Howell et al. |
| 8,386,377 B1 | 2/2013 | Xiong et al. |
| 8,397,171 B2 | 3/2013 | Klassen et al. |
| 8,400,448 B1 | 3/2013 | Doyle, Jr. |
| 8,407,180 B1 | 3/2013 | Ramesh et al. |
| 8,412,234 B1 | 4/2013 | Gatmir-Motahari et al. |
| 8,412,707 B1 | 4/2013 | Mianji |
| 8,422,825 B1 | 4/2013 | Neophytou et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,508,533 B2 | 8/2013 | Cervelli et al. |
| 8,514,229 B2 | 8/2013 | Cervelli et al. |
| 8,515,207 B2 | 8/2013 | Chau |
| 8,564,596 B2 | 10/2013 | Carrino et al. |
| 8,577,911 B1 | 11/2013 | Stepinski et al. |
| 8,589,273 B2 | 11/2013 | Creeden et al. |
| 8,688,573 B1 | 4/2014 | Rukonic et al. |
| 8,742,934 B1 | 6/2014 | Sarpy et al. |
| 8,744,890 B1 | 6/2014 | Bernier |
| 8,781,169 B2 | 7/2014 | Jackson et al. |
| 8,799,799 B1 | 8/2014 | Cervelli et al. |
| 8,806,355 B2 | 8/2014 | Twiss et al. |
| 8,812,960 B1 | 8/2014 | Sun et al. |
| 8,830,322 B2 | 9/2014 | Nerayoff et al. |
| 8,924,388 B2 | 12/2014 | Elliot et al. |
| 8,924,389 B2 | 12/2014 | Elliot et al. |
| 8,938,686 B1 | 1/2015 | Erenrich et al. |
| 8,949,164 B1 | 2/2015 | Mohler |
| 8,983,494 B1 | 3/2015 | Onnen et al. |
| 9,009,177 B2 | 4/2015 | Zheng et al. |
| 9,021,384 B1 | 4/2015 | Beard et al. |
| 9,069,842 B2 | 6/2015 | Melby |
| 9,100,428 B1 | 8/2015 | Visbal |
| 9,104,293 B1 | 8/2015 | Kornfeld et al. |
| 9,104,695 B1 | 8/2015 | Cervelli et al. |
| 9,111,281 B2 | 8/2015 | Stibel et al. |
| 9,111,380 B2 | 8/2015 | Piemonte et al. |
| 9,129,219 B1 | 9/2015 | Robertson et al. |
| 9,146,125 B2 | 9/2015 | Vulcano et al. |
| 9,256,664 B2 | 2/2016 | Chakerian et al. |
| 9,280,618 B1 * | 3/2016 | Bruce ............... G06F 17/5009 |
| 2002/0003539 A1 | 1/2002 | Abe |
| 2002/0033848 A1 | 3/2002 | Sciammarella et al. |
| 2002/0065708 A1 | 5/2002 | Senay et al. |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0130867 A1 | 9/2002 | Yang et al. |
| 2002/0130906 A1 | 9/2002 | Miyaki |
| 2002/0147805 A1 | 10/2002 | Leshem et al. |
| 2003/0052896 A1 | 3/2003 | Higgins et al. |
| 2003/0103049 A1 | 6/2003 | Kindratenko et al. |
| 2003/0126102 A1 | 7/2003 | Borthwick |
| 2003/0144868 A1 | 7/2003 | MacIntyre et al. |
| 2003/0163352 A1 | 8/2003 | Surpin et al. |
| 2003/0225755 A1 | 12/2003 | Iwayama et al. |
| 2004/0030492 A1 | 2/2004 | Fox et al. |
| 2004/0034570 A1 | 2/2004 | Davis |
| 2004/0039498 A1 | 2/2004 | Ollis et al. |
| 2004/0098236 A1 | 5/2004 | Mayer et al. |
| 2004/0111480 A1 | 6/2004 | Yue |
| 2004/0143602 A1 | 7/2004 | Ruiz et al. |
| 2004/0153418 A1 | 8/2004 | Hanweck |
| 2004/0236688 A1 | 11/2004 | Bozeman |
| 2005/0010472 A1 | 1/2005 | Quatse et al. |
| 2005/0031197 A1 | 2/2005 | Knopp |
| 2005/0034062 A1 | 2/2005 | Bufkin et al. |
| 2005/0080769 A1 | 4/2005 | Gemmell |
| 2005/0086207 A1 | 4/2005 | Heuer et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0182502 A1 | 8/2005 | Iyengar |
| 2005/0182793 A1 | 8/2005 | Keenan et al. |
| 2005/0223044 A1 | 10/2005 | Ashworth et al. |
| 2005/0267652 A1 | 12/2005 | Allstadt et al. |
| 2006/0026120 A1 | 2/2006 | Carolan et al. |

(56) References Cited

U.S. PATENT DOCUMENTS

| | | |
|---|---|---|
| 2006/0026170 A1 | 2/2006 | Kreitler et al. |
| 2006/0080283 A1 | 4/2006 | Shipman |
| 2006/0139375 A1 | 6/2006 | Rasmussen et al. |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0146050 A1 | 7/2006 | Yamauchi |
| 2006/0149596 A1 | 7/2006 | Surpin et al. |
| 2006/0200384 A1 | 9/2006 | Arutunian et al. |
| 2006/0241974 A1 | 10/2006 | Chao et al. |
| 2006/0251307 A1 | 11/2006 | Florin et al. |
| 2006/0259527 A1 | 11/2006 | Devarakonda et al. |
| 2006/0271277 A1 | 11/2006 | Hu et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0024620 A1 | 2/2007 | Muller-Fischer et al. |
| 2007/0038646 A1 | 2/2007 | Thota |
| 2007/0057966 A1 | 3/2007 | Ohno et al. |
| 2007/0078832 A1 | 4/2007 | Ott et al. |
| 2007/0115373 A1 | 5/2007 | Gallagher et al. |
| 2007/0150801 A1 | 6/2007 | Chidlovskii et al. |
| 2007/0156673 A1 | 7/2007 | Maga |
| 2007/0162454 A1 | 7/2007 | D'Albora et al. |
| 2007/0185867 A1 | 8/2007 | Maga |
| 2007/0188516 A1 | 8/2007 | Loup et al. |
| 2007/0192122 A1 | 8/2007 | Routson et al. |
| 2007/0208497 A1 | 9/2007 | Downs et al. |
| 2007/0208498 A1 | 9/2007 | Barker et al. |
| 2007/0239871 A1* | 10/2007 | Kaskie ............... G06Q 30/02 709/224 |
| 2007/0258642 A1 | 11/2007 | Thota |
| 2007/0284433 A1 | 12/2007 | Domenica et al. |
| 2007/0294643 A1 | 12/2007 | Kyle |
| 2008/0010605 A1 | 1/2008 | Frank |
| 2008/0040684 A1 | 2/2008 | Crump |
| 2008/0065655 A1 | 3/2008 | Chakravarthy et al. |
| 2008/0077642 A1 | 3/2008 | Carbone et al. |
| 2008/0082578 A1 | 4/2008 | Hogue et al. |
| 2008/0098085 A1 | 4/2008 | Krane et al. |
| 2008/0104019 A1 | 5/2008 | Nath |
| 2008/0133579 A1 | 6/2008 | Lim |
| 2008/0163073 A1 | 7/2008 | Becker et al. |
| 2008/0192053 A1 | 8/2008 | Howell et al. |
| 2008/0195417 A1 | 8/2008 | Surpin et al. |
| 2008/0208735 A1 | 8/2008 | Balet et al. |
| 2008/0222295 A1 | 9/2008 | Robinson et al. |
| 2008/0223834 A1 | 9/2008 | Griffiths et al. |
| 2008/0229056 A1 | 9/2008 | Agarwal et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270468 A1 | 10/2008 | Mao |
| 2008/0278311 A1 | 11/2008 | Grange et al. |
| 2008/0288306 A1 | 11/2008 | MacIntyre et al. |
| 2008/0294663 A1 | 11/2008 | Heinley et al. |
| 2008/0294678 A1 | 11/2008 | Gorman et al. |
| 2008/0301643 A1 | 12/2008 | Appleton et al. |
| 2008/0313132 A1 | 12/2008 | Hao et al. |
| 2009/0002492 A1 | 1/2009 | Velipasalar et al. |
| 2009/0027418 A1 | 1/2009 | Maru et al. |
| 2009/0088964 A1 | 4/2009 | Schaaf et al. |
| 2009/0094270 A1 | 4/2009 | Alirez et al. |
| 2009/0100018 A1 | 4/2009 | Roberts |
| 2009/0106178 A1 | 4/2009 | Chu |
| 2009/0112745 A1 | 4/2009 | Stefanescu |
| 2009/0115786 A1 | 5/2009 | Shmiaski et al. |
| 2009/0125359 A1 | 5/2009 | Knapic et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0144262 A1 | 6/2009 | White et al. |
| 2009/0157732 A1 | 6/2009 | Hao et al. |
| 2009/0158185 A1 | 6/2009 | Lacevic et al. |
| 2009/0171939 A1 | 7/2009 | Athsani et al. |
| 2009/0172511 A1 | 7/2009 | Decherd et al. |
| 2009/0179892 A1 | 7/2009 | Tsuda et al. |
| 2009/0187447 A1 | 7/2009 | Cheng et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0222400 A1 | 9/2009 | Kupershmidt et al. |
| 2009/0249244 A1 | 10/2009 | Robinson et al. |
| 2009/0254842 A1 | 10/2009 | Leacock et al. |
| 2009/0271343 A1 | 10/2009 | Vaiciulis et al. |
| 2009/0292626 A1 | 11/2009 | Oxford |
| 2009/0307049 A1 | 12/2009 | Elliott et al. |
| 2009/0313463 A1 | 12/2009 | Pang et al. |
| 2009/0319418 A1 | 12/2009 | Herz |
| 2009/0319891 A1 | 12/2009 | MacKinlay et al. |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0063961 A1 | 3/2010 | Guiheneuf et al. |
| 2010/0070523 A1 | 3/2010 | Delgo et al. |
| 2010/0070842 A1 | 3/2010 | Aymeloglu et al. |
| 2010/0076968 A1 | 3/2010 | Boyns et al. |
| 2010/0098318 A1 | 4/2010 | Anderson |
| 2010/0106420 A1 | 4/2010 | Mattikalli et al. |
| 2010/0106752 A1 | 4/2010 | Eckardt et al. |
| 2010/0114887 A1 | 5/2010 | Conway et al. |
| 2010/0131502 A1 | 5/2010 | Fordham |
| 2010/0161735 A1 | 6/2010 | Sharma |
| 2010/0162176 A1 | 6/2010 | Dunton |
| 2010/0185692 A1 | 7/2010 | Zhang et al. |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0211535 A1 | 8/2010 | Rosenberger |
| 2010/0235915 A1 | 9/2010 | Memon et al. |
| 2010/0262688 A1 | 10/2010 | Hussain et al. |
| 2010/0277611 A1 | 11/2010 | Holt et al. |
| 2010/0293174 A1 | 11/2010 | Bennett et al. |
| 2010/0312837 A1 | 12/2010 | Bodapati et al. |
| 2010/0321399 A1 | 12/2010 | Ellren et al. |
| 2011/0022312 A1 | 1/2011 | McDonough et al. |
| 2011/0061013 A1 | 3/2011 | Billicki et al. |
| 2011/0078173 A1 | 3/2011 | Seligmann et al. |
| 2011/0090254 A1 | 4/2011 | Carrino et al. |
| 2011/0093327 A1 | 4/2011 | Fordyce, III et al. |
| 2011/0099133 A1 | 4/2011 | Chang et al. |
| 2011/0117878 A1 | 5/2011 | Barash et al. |
| 2011/0137766 A1 | 6/2011 | Rasmussen et al. |
| 2011/0153368 A1 | 6/2011 | Pierre et al. |
| 2011/0153384 A1 | 6/2011 | Horne et al. |
| 2011/0161096 A1 | 6/2011 | Buehler et al. |
| 2011/0170799 A1 | 7/2011 | Carrino et al. |
| 2011/0173093 A1 | 7/2011 | Psota et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0218955 A1 | 9/2011 | Tang |
| 2011/0225198 A1 | 9/2011 | Edwards et al. |
| 2011/0238690 A1 | 9/2011 | Arrasvuori et al. |
| 2011/0270604 A1 | 11/2011 | Qi et al. |
| 2011/0270705 A1 | 11/2011 | Parker |
| 2011/0270834 A1 | 11/2011 | Sokolan et al. |
| 2011/0289397 A1 | 11/2011 | Eastmond et al. |
| 2011/0295649 A1 | 12/2011 | Fine |
| 2011/0314007 A1 | 12/2011 | Dassa et al. |
| 2011/0314024 A1 | 12/2011 | Chang et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |

(56) References Cited

U.S. PATENT DOCUMENTS

| | | |
|---|---|---|
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084287 A1 | 4/2012 | Lakshminarayan et al. |
| 2012/0106801 A1 | 5/2012 | Jackson |
| 2012/0131512 A1 | 5/2012 | Takeuchi et al. |
| 2012/0144335 A1 | 6/2012 | Abeln et al. |
| 2012/0158527 A1* | 6/2012 | Cannelongo ........... G06Q 30/02 705/14.73 |
| 2012/0159362 A1 | 6/2012 | Brown et al. |
| 2012/0159363 A1 | 6/2012 | DeBacker et al. |
| 2012/0173381 A1 | 7/2012 | Smith |
| 2012/0173985 A1 | 7/2012 | Peppel |
| 2012/0206469 A1 | 8/2012 | Hulubei et al. |
| 2012/0208636 A1 | 8/2012 | Feige |
| 2012/0215784 A1 | 8/2012 | King et al. |
| 2012/0221553 A1 | 8/2012 | Wittmer et al. |
| 2012/0221580 A1 | 8/2012 | Barney |
| 2012/0226523 A1 | 9/2012 | Weiss et al. |
| 2012/0245976 A1 | 9/2012 | Kumar et al. |
| 2012/0323888 A1 | 12/2012 | Osann, Jr. |
| 2013/0006725 A1 | 1/2013 | Simanek et al. |
| 2013/0016106 A1 | 1/2013 | Yip et al. |
| 2013/0021445 A1 | 1/2013 | Cossette-Pacheco et al. |
| 2013/0054306 A1 | 2/2013 | Bhalla |
| 2013/0057551 A1 | 3/2013 | Ebert et al. |
| 2013/0060786 A1 | 3/2013 | Serrano et al. |
| 2013/0073377 A1 | 3/2013 | Heath |
| 2013/0076732 A1 | 3/2013 | Cervelli et al. |
| 2013/0096988 A1 | 4/2013 | Grossman et al. |
| 2013/0100134 A1 | 4/2013 | Cervelli et al. |
| 2013/0101159 A1 | 4/2013 | Chao et al. |
| 2013/0110746 A1 | 5/2013 | Ahn |
| 2013/0132398 A1 | 5/2013 | Pfeifle |
| 2013/0150004 A1 | 6/2013 | Rosen |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0176321 A1 | 7/2013 | Mitchell et al. |
| 2013/0179420 A1 | 7/2013 | Park et al. |
| 2013/0185245 A1 | 7/2013 | Anderson |
| 2013/0185307 A1 | 7/2013 | El-Yaniv et al. |
| 2013/0226318 A1 | 8/2013 | Procyk |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0254900 A1 | 9/2013 | Sathish et al. |
| 2013/0263019 A1 | 10/2013 | Castellanos et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0282723 A1 | 10/2013 | Petersen et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0339891 A1 | 12/2013 | Blumenberg et al. |
| 2014/0012796 A1 | 1/2014 | Petersen et al. |
| 2014/0040371 A1 | 2/2014 | Gurevich et al. |
| 2014/0058914 A1 | 2/2014 | Song et al. |
| 2014/0068487 A1 | 3/2014 | Steiger et al. |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0176606 A1 | 6/2014 | Narayan et al. |
| 2014/0189536 A1 | 7/2014 | Lange et al. |
| 2014/0195515 A1 | 7/2014 | Baker et al. |
| 2014/0218400 A1 | 8/2014 | O'Toole et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0358829 A1 | 12/2014 | Hurwitz |
| 2014/0361899 A1 | 12/2014 | Layson |
| 2014/0366132 A1 | 12/2014 | Stiansen et al. |
| 2015/0029176 A1 | 1/2015 | Baxter et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0100907 A1 | 4/2015 | Erenrich et al. |
| 2015/0106170 A1* | 4/2015 | Bonica ................ G06F 17/3053 705/12 |
| 2015/0106379 A1 | 4/2015 | Elliot et al. |
| 2015/0134599 A1 | 5/2015 | Banerjee et al. |
| 2015/0135256 A1 | 5/2015 | Hoy et al. |
| 2015/0186821 A1 | 7/2015 | Wang et al. |
| 2015/0187036 A1 | 7/2015 | Wang et al. |
| 2015/0187100 A1 | 7/2015 | Berry et al. |
| 2015/0188872 A1 | 7/2015 | White |
| 2015/0242401 A1 | 8/2015 | Liu |
| 2015/0312323 A1 | 10/2015 | Peterson |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |

FOREIGN PATENT DOCUMENTS

| | | |
|---|---|---|
| CN | 103167093 | 6/2013 |
| CN | 102054015 | 5/2014 |
| DE | 102014204827 | 9/2014 |
| DE | 102014204830 | 9/2014 |
| DE | 102014204834 | 9/2014 |
| DE | 102013222023 | 1/2015 |
| EP | 0763201 | 3/1997 |
| EP | 2487610 | 8/2012 |
| EP | 2575107 | 4/2013 |
| EP | 2858014 | 4/2015 |
| EP | 2858018 | 4/2015 |
| EP | 2869211 | 5/2015 |
| EP | 2889814 | 7/2015 |
| EP | 2892197 | 7/2015 |
| EP | 2963595 | 1/2016 |
| GB | 2516155 | 1/2015 |
| NL | 2012778 | 11/2014 |
| NZ | 624557 | 12/2014 |
| WO | WO 95/32424 | 11/1995 |
| WO | WO 00/09529 | 2/2000 |
| WO | WO 01/98925 | 12/2001 |
| WO | WO 2004/057268 | 7/2004 |
| WO | WO 2005/013200 | 2/2005 |
| WO | WO 2005/116851 | 12/2005 |
| WO | WO 2008/064207 | 5/2008 |
| WO | WO 2009/061501 | 5/2009 |
| WO | WO 2009/123975 | 10/2009 |
| WO | WO 2011/058507 | 5/2011 |

OTHER PUBLICATIONS

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

"Andy Turner's GISRUK 2012 Notes" <https://docs.google.com/document/d/1cTmxg7mVx5gd89lqblCYvCEnHA4QAivH4l4WpyPsqE4/edit?pli=1> printed Sep. 16, 2013 in 15 pages.

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Barnes et al., "Viewshed Analysis", GIS-ARC/INFO 2001, <www.evsc.virginia.edu/~jhp7e/evsc466/student_pres/Rounds.pdf>.

(56) References Cited

OTHER PUBLICATIONS

Capptain—Pilot Your Apps, <http://www.capptain.com> Printed Jul. 18, 2013 in 6 pages.
Carver et al., "Real-Time Visibility Analysis and Rapid Viewshed Calculation Using a Voxel-Based Modelling Approach," GISRUK 2012 Conference, Apr. 11-13, Lancaster UK, Apr. 13, 2012, pp. 6.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Cohn et al., "Semi-supervised Clustering with User Feedback," Constrained Clustering: Advances in Algorithms, Theory, and Applications 4.1, 2003, pp. 17-32.
Countly Mobile Analytics, <http://count.ly/> Printed Jul. 18, 2013 in 9 pages.
Definition "Identify" downloaded Jan. 22, 2015, 1 page.
Definition "Overlay" downloaded Jan. 22, 2015, 1 page.
Distimo—App Analytics, <http://www.distimo.com/app-analytics> Printed Jul. 18, 2013 in 5 pages.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Flurry Analytics, <http://www.flurry.com/> Printed Jul. 18, 2013 in 14 pages.
Ghosh, P., "A Solution of Polygon Containment, Spatial Planning, and Other Related Problems Using Minkowski Operations," Computer Vision, Graphics, and Image Processing, 1990, vol. 49, pp. 1-35.
Gis-Net 3 Public—Department of Regional Planning. Planning & Zoning Information for Unincorporated LA County. Retrieved Oct. 2, 2013 from http://gis.planning.lacounty.gov/GIS-NET3_Public/Viewer.html.
Google Analytics Official Website—Web Analytics & Reporting, <http://www.google.com/analytics.index.html> Printed Jul. 18, 2013 in 22 pages.
Gorr et al., "Crime Hot Spot Forecasting: Modeling and Comparative Evaluation," Grant 98-IJ-CX-K005, May 6, 2002, 37 pages.
Griffith, Daniel A., "A Generalized Huff Model," Geographical Analysis, Apr. 1982, vol. 14, No. 2, pp. 135-144.
Gu et al., "Record Linkage: Current Practice and Future Directions," Jan. 15, 2004, pp. 32.
Hansen et al. "Analyzing Social Media Networks with NodeXL: Insights from a Connected World", Chapter 4, pp. 53-67 and Chapter 10, pp. 143-164, published Sep. 2010.
Haralick et al., "Image Analysis Using Mathematical Morphology," Pattern Analysis and Machine Intelligence, IEEE Transactions, Jul. 1987, vol. PAMI-9, No. 4, pp. 532-550.
Hibbert et al., "Prediction of Shopping Behavior Using a Huff Model Within a GIS Framework," Healthy Eating in Context, Mar. 18, 2011, pp. 16.
Hua et al., "A Multi-attribute Data Structure with Parallel Bloom Filters for Network Services" HiPC 2006, LNCS 4297, pp. 277-288, 2006.
Huang et al., "Systematic and Integrative Analysis of Large Gene Lists Using DAVID Bioinformatics Resources," Nature Protocols, 4.1, 2008, 44-57.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Ipbucker, C., "Inverse Transformation for Several Pseudo-cylindrical Map Projections Using Jacobian Matrix," ICCSA 2009, Part 1 LNCS 5592, pp. 553-564.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kontagent Mobile Analytics, <http://www.kontagent.com/> Printed Jul. 18, 2013 in 9 pages.
Levine, N., "Crime Mapping and the Crimestat Program," Geographical Analysis, 2006, vol. 38, pp. 41-56.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Localytics—Mobile App Marketing & Analytics, <http://www.localytics.com/> Printed Jul. 18, 2013 in 12 pages.
Mandagere, Nagapramod, "Buffer Operations in GIS," <http://www-users.cs.umn.edu/~npramod/enc_pdf.pdf> retrieved Jan. 28, 2010, pp. 7.
Manno et al., "Introducing Collaboration in Single-user Applications through the Centralized Control Architecture," 2010, pp. 10.
Map Builder, "Rapid Mashup Development Tool for Google and Yahoo Maps!" <http://web.archive.org/web/20090626224734/http://www.mapbuilder.net/> printed Jul. 20, 2012 in 2 pages.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Mixpanel—Mobile Analytics, <https://mixpanel.com/> Printed Jul. 18, 2013 in 13 pages.
Murray, C., Oracle Spatial Developer's Guide—6 Coordinate Systems (Spatial Reference Systems), <http://docs.oracle.com/cd/B28359_01/appdev.111/b28400.pdf>, Jun. 2009.
Open Street Map, "Amm's Diary:Unconnected ways and other data quality issues," http://www.openstreetmap.org/user/amm/diary printed Jul. 23, 2012 in 3 pages.
Open Web Analytics (OWA), <http://www.openwebanalytics.com/> Printed Jul. 19, 2013 in 5 pages.
Piwik—Free Web Analytics Software. <http://piwik.org/> Printed Jul. 19, 2013 in18 pages.
POI Editor, "How To: Create Your Own Points of Interest," <http://www.poieditor.com/articles/how_to_create_your_own_points_of_interest/>printed Jul. 22, 2012 in 4 pages.
Pozzi et al., "Vegetation and Population Density in Urban and Suburban Areas in the U.S.A." Third International Symposium of Remote Sensing of Urban Areas Istanbul, Turkey, Jun. 2002, pp. 8.
Qiu, Fang, "3d Analysis and Surface Modeling", <http://web.archive.org/web/20091202221925/http://www.utsa.edu/Irsg/Teaching/EES6513/08-3D.pdf> printed Sep. 16, 2013 in 26 pages.
Reddy et al., "Under the hood of GeoVRML 1.0," SRI International, Proceedings of the fifth symposium on Vurtual Reality Modeling Language (Web3D-VRML), New York, NY, Feb. 2000, pp. 23-28. <http://pdf.aminer.org/000/648/038/under_the_hood_of_geovrml.pdf>.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Reibel et al., "Areal Interpolation of Population Counts Using Pre-classified Land Cover Data," Population Research and Policy Review, 2007, vol. 26, pp. 619-633.

(56) References Cited

OTHER PUBLICATIONS

Reibel, M., "Geographic Information Systems and Spatial Data Processing in Demography: a Review," Population Research and Policy Review, 2007, vol. 26, pp. 601-618.
Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.
Sigrist et al., "PROSITE, a Protein Domain Database for Functional Characterization and Annotation," Nucleic Acids Research 38.Suppl 1, 2010, pp. D161-D166.
Snyder, "Map Projections—A Working Manual," U.S. Geological Survey Professional paper 1395, United States Government Printing Office, Washington: 1987, pp. 11-21 and 60-70.
Sonris, "Using the Area of Interest Tools," <http://web.archive.org/web/20061001053327/http://sonris-www.dnr.state.la.us/gis/instruct_files/tutslide12> printed Jan. 3, 2013 in 1 page.
StatCounter—Free Invisible Web Tracker, Hit Counter and Web Stats, <http://statcounter.com/> Printed Jul. 19, 2013 in 17 pages.
Tangelder et al., "Freeform Shape Matching Using Minkowski Operations," The Netherlands, Jun. 1996, pp. 12.
TestFlight—Beta Testing on the Fly, <http://testflightapp.com/> Printed Jul. 18, 2013 in 3 pages.
Thompson, Mick, "Getting Started with GEO," Getting Started with GEO, Jul. 26, 2011.
trak.io, <http://trak.io/> printed Jul. 18, 2013 in 3 pages.
UserMetrix, <http://usermetrix.com/android-analytics> printed Jul. 18, 2013 in 3 pages.
Valentini et al., "Ensembles of Learning Machines," M. Marinaro and R. Tagliaferri (Eds.): WIRN VIETRI 2002, LNCS 2486, pp. 3-20.
VB Forums, "Buffer A Polygon," Internet Citation, <http://www.vbforums.com/showthread.php?198436-Buffer-a-Polygon>, Specifically Thread #1, #5 & #11 retrieved on May 2, 2013, pp. 8.
Vivid Solutions, "JTS Topology Suite: Technical Specifications," <http://www.vividsolutions.com/jts/bin/JTS%20Technical%20Specs.pdf> Version 1.4, 2003, pp. 36.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Wikipedia, "Douglas—Peucker-Algorithms," <http://de.wikipedia.org/w/index.php?title=Douglas-Peucker-Algorithmus&oldid=91846042> printed Jul. 2011, pp. 2.
Wikipedia, "Ramer—Douglas—Peucker Algorithm," <http://en.wikipedia.org/wiki/Ramer%E2%80%93Douglas%E2%80%93Peucker_algorithm> printed Jul. 2011, pp. 3.
Wongsuphasawat et al., "Visual Analytics for Transportation Incident Data Sets," Transportation Research Record 2138, 2009, pp. 135-145.
Woodbridge, Stephen, "[geos-devel] Polygon simplification," <http://lists.osgeo.org/pipermail/geos-devel/2011-May/005210.html> dated May 8, 2011, pp. 3.
Issue Notification for U.S. Appl. No. 13/917,571 dated Aug. 5, 2014.
Notice of Allowance for U.S. Appl. No. 13/948,859 dated Dec. 10, 2014.
Notice of Allowance for U.S. Appl. No. 14/294,098 dated Dec. 29, 2014.
Notice of Allowance for U.S. Appl. No. 14/479,863 dated Mar. 31, 2015.
Notice of Allowance for U.S. Appl. No. 12/840,673 dated Apr. 6, 2015.
Notice of Allowance for U.S. Appl. No. 14/319,161 dated May 4, 2015.
Notice of Allowance for U.S. Appl. No. 14/552,336 dated Nov. 3, 2015.
Official Communication for U.S. Appl. No. 14/289,596 dated Jul. 18, 2014.
Official Communication for U.S. Appl. No. 14/289,599 dated Jul. 22, 2014.
Official Communication for U.S. Appl. No. 14/225,160 dated Jul. 29, 2014.
Official Communication for U.S. Appl. No. 14/294,098 dated Aug. 15, 2014.
Official Communication for U.S. Appl. No. 14/225,084 dated Sep. 2, 2014.
Official Communication for U.S. Appl. No. 14/225,006 dated Sep. 10, 2014.
Official Communication for U.S. Appl. No. 12/840,673 dated Sep. 17, 2014.
Official Communication for U.S. Appl. No. 14/451,221 dated Oct. 21, 2014.
Official Communication for U.S. Appl. No. 14/225,160 dated Oct. 22, 2014.
Official Communication for U.S. Appl. No. 14/294,098 dated Nov. 6, 2014.
Official Communication for U.S. Appl. No. 14/463,615 dated Nov. 13, 2014.
Official Communication for U.S. Appl. No. 13/827,491 dated Dec. 1, 2014.
Official Communication for U.S. Appl. No. 14/479,863 dated Dec. 26, 2014.
Official Communication for U.S. Appl. No. 12/840,673 dated Jan. 2, 2015.
Official Communication for U.S. Appl. No. 14/319,161 dated Jan. 23, 2015.
Official Communication for U.S. Appl. No. 14/289,596 dated Jan. 26, 2015.
Official Communication for U.S. Appl. No. 13/728,879 dated Jan. 27, 2015.
Official Communication for U.S. Appl. No. 14/483,527 dated Jan. 28, 2015.
Official Communication for U.S. Appl. No. 14/463,615 dated Jan. 28, 2015.
Official Communication for U.S. Appl. No. 14/225,160 dated Feb. 11, 2015.
Official Communication for U.S. Appl. No. 14/225,084 dated Feb. 20, 2015.
Official Communication for U.S. Appl. No. 14/225,006 dated Feb. 27, 2015.
Official Communication for U.S. Appl. No. 14/571,098 dated Mar. 11, 2015.
Official Communication for U.S. Appl. No. 13/728,879 dated Mar. 17, 2015.
Official Communication for U.S. Appl. No. 14/289,596 dated Apr. 30, 2015.
Official Communication for U.S. Appl. No. 14/225,160 dated May 20, 2015.
Official Communication for U.S. Appl. No. 14/463,615 dated May 21, 2015.
Official Communication for U.S. Appl. No. 14/289,599 dated May 29, 2015.
Official Communication for U.S. Appl. No. 13/827,491 dated Jun. 22, 2015.
Official Communication for U.S. Appl. No. 14/483,527 dated Jun. 22, 2015.
Official Communication for U.S. Appl. No. 14/552,336 dated Jul. 20, 2015.
Official Communication for U.S. Appl. No. 14/676,621 dated Jul. 30, 2015.
Official Communication for U.S. Appl. No. 14/571,098 dated Aug. 5, 2015.
Official Communication for U.S. Appl. No. 14/225,160 dated Aug. 12, 2015.
Official Communication for U.S. Appl. No. 13/728,879 dated Aug. 12, 2015.
Official Communication for U.S. Appl. No. 14/490,612 dated Aug. 18, 2015.
Official Communication for U.S. Appl. No. 14/571,098 dated Aug. 24, 2015.

(56) References Cited

OTHER PUBLICATIONS

Official Communication for U.S. Appl. No. 14/225,006 dated Sep. 2, 2015.
Official Communication for U.S. Appl. No. 14/289,599 dated Sep. 4, 2015.
Official Communication for U.S. Appl. No. 14/631,633 dated Sep. 10, 2015.
Official Communication for U.S. Appl. No. 14/463,615 dated Sep. 10, 2015.
Official Communication for U.S. Appl. No. 14/225,084 dated Sep. 11, 2015.
Official Communication for U.S. Appl. No. 14/562,524 dated Sep. 14, 2015.
Official Communication for U.S. Appl. No. 14/730,123 dated Sep. 21, 2015.
Official Communication for U.S. Appl. No. 14/813,749 dated Sep. 28, 2015.
Official Communication for U.S. Appl. No. 14/746,671 dated Sep. 28, 2015.
Official Communication for U.S. Appl. No. 14/141,252 dated Oct. 8, 2015.
Official Communication for U.S. Appl. No. 13/827,491 dated Oct. 9, 2015.
Official Communication for U.S. Appl. No. 14/483,527 dated Oct. 28, 2015.
Official Communication for U.S. Appl. No. 14/676,621 dated Oct. 29, 2015.
Official Communication for U.S. Appl. No. 14/571,098 dated Nov. 10, 2015.
Official Communication for U.S. Appl. No. 14/562,524 dated Nov. 10, 2015.
Official Communication for U.S. Appl. No. 14/842,734 dated Nov. 19, 2015.
Official Communication for U.S. Appl. No. 13/728,879 dated Nov. 20, 2015.
Official Communication for Australian Patent Application No. 2014202442 dated Mar. 19, 2015.
Official Communication for Australian Patent Application No. 2014213553 dated May 7, 2015.
Notice of Acceptance for Australian Patent Application No. 201221622 dated Jan. 6, 2015.
Official Communication for European Patent Application No. 14187996.5 dated Feb. 12, 2015.
Official Communication for European Patent Application No. 14200298.9 dated May 13, 2015.
Official Communication for European Patent Application No. 14191540.5 dated May 27, 2015.
Official Communication for European Patent Application No. 14187739.9 dated Jul. 6, 2015.
Official Communication for European Patent Application No. 15181419.1 dated Sep. 29, 2015.
Official Communication for Great Britain Patent Application No. 1404499.4 dated Aug. 20, 2014.
Official Communication for Great Britain Patent Application No. 1404486.1 dated Aug. 27, 2014.
Official Communication for Great Britain Patent Application No. 1404489.5 dated Aug. 27, 2014.
Official Communication for Great Britain Patent Application No. 1404499.4 dated Sep. 29, 2014.
Official Communication for Great Britain Patent Application No. 1404489.5 dated Oct. 6, 2014.
Official Communication for Great Britain Patent Application No. 1408025.3 dated Nov. 6, 2014.
Official Communication for Great Britain Patent Application No. 1404486.1 dated May 21, 2015.
Official Communication for Great Britain Patent Application No. 1404489.5 dated May 21, 2015.
Official Communication for Great Britain Patent Application No. 1404499.4 dated Jun. 11, 2015.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 622473 dated Jun. 19, 2014.
Official Communication for New Zealand Patent Application No. 628161 dated Aug. 25, 2014.
Official Communication for New Zealand Patent Application No. 628585 dated Aug. 26, 2014.
Official Communication for New Zealand Patent Application No. 628840 dated Aug. 28, 2014.
Chaudhuri et al., "An Overview of Business Intelligence Technology," Communications of the ACM, Aug. 2011, vol. 54, No. 8.
Wikipedia, "Multimap," Jan. 1, 2013, https://en.wikipedia.org/w/index.php?title=Multimap&oldid=530800748.
Notice of Allowance for U.S. Appl. No. 14/323,935 dated Oct. 1, 2015.
Notice of Allowance for U.S. Appl. No. 14/746,671 dated Jan. 21, 2016.
Notice of Allowance for U.S. Appl. No. 14/858,647 dated Mar. 4, 2016.
Official Communication for U.S. Appl. No. 14/746,671 dated Nov. 12, 2015.
Official Communication for U.S. Appl. No. 14/306,138 dated Dec. 3, 2015.
Official Communication for U.S. Appl. No. 14/463,615 dated Dec. 9, 2015.
Official Communication for U.S. Appl. No. 14/800,447 dated Dec. 10, 2015.
Official Communication for U.S. Appl. No. 14/225,006 dated Dec. 21, 2015.
Official Communication for U.S. Appl. No. 14/306,147, dated Dec. 24, 2015.
Official Communication for U.S. Appl. No. 14/306,138 dated Dec. 24, 2015.
Official Communication for U.S. Appl. No. 14/225,084 dated Jan. 4, 2016.
Official Communication for U.S. Appl. No. 14/225,160 dated Jan. 25, 2016.
Official Communication for U.S. Appl. No. 14/319,765 dated Feb. 1, 2016.
Official Communication for U.S. Appl. No. 14/929,584 dated Feb. 4, 2016.
Official Communication for U.S. Appl. No. 14/934,004 dated Feb. 16, 2016.
Official Communication for U.S. Appl. No. 14/571,098 dated Feb. 23, 2016.
Official Communication for U.S. Appl. No. 14/225,084 dated Feb. 26, 2016.
Official Communication for European Patent Application No. 14200246.8 dated May 29, 2015.
Official Communication for European Patent Application No. 15184764.7 dated Dec. 14, 2015.
Official Communication for European Patent Application No. 14187996.5 dated Feb. 19, 2016.
Official Communication for Netherlands Patents Application No. 2012421 dated Sep. 18, 2015.
Official Communication for Netherlands Patents Application No. 2012417 dated Sep. 18, 2015.
Official Communication for Netherlands Patent Application 2012438 dated Sep. 21, 2015.
Official Communication for Netherlands Patent Application No. 2012778 dated Sep. 22, 2015.
Official Communication for Netherlands Patent Application No. 2011632 dated Feb. 8, 2016.
Notice of Allowance for U.S. Appl. No. 14/730,123 dated Apr. 12, 2016.
Notice of Allowance for U.S. Appl. No. 13/728,879 dated Jun. 21, 2016.

(56) References Cited

OTHER PUBLICATIONS

Official Communication for U.S. Appl. No. 14/289,596 dated May 9, 2016.

* cited by examiner

COMPUTER-IMPLEMENTED SYSTEMS AND METHODS FOR DATA MANAGEMENT AND VISUALIZATION

CROSS REFERENCE TO RELATED APPLICATIONS

This application claims priority to U.S. Provisional Patent Application No. 62/214,840, which was filed on Sep. 4, 2015, the disclosure of which is expressly incorporated herein by reference in its entirety.

BACKGROUND

In today's information age, individuals, businesses, and other entities have access to many information sources. The Internet, for example, has become one of the world's largest sources of information and provides instantaneous access to data from across the globe. Other sources of information include personal and corporate databases, as well as professional data sources.

Data and the information derived from it can be used for many purposes. In some cases, it may be used for personal reasons, such as determining where to live or travel. In other cases, it may be used for commercial or business reasons. For example, a company may desire to analyze a number of different states or geographic regions to determine where to build or relocate a new factory or office. In a knowledge economy, information can also be used to provide commercialized products and solutions for consumers.

Current systems and tools for analyzing data, however, do not allow users to efficiently manage and analyze data. Among other things, current solutions do not allow users to select, weigh, manipulate, and visualize data in ways suitable to their needs. Thus, it may be difficult and time consuming for a user to evaluate data for a variety of purposes, such as to calculate the desirability of a given location based on a set of criteria or to weigh locations against one another. Current solutions also suffer from other drawbacks, such as limited scalability, flexibility, and/or customization. Therefore, improved systems and methods are desired that provide effective data management and visualization features, while addressing one or more of the above drawbacks and disadvantages.

BRIEF DESCRIPTION OF THE DRAWINGS

Reference will now be made to the accompanying drawings, which illustrate exemplary embodiments of the present disclosure. In the drawings.

DESCRIPTION OF EXEMPLARY EMBODIMENTS

Figure 1:
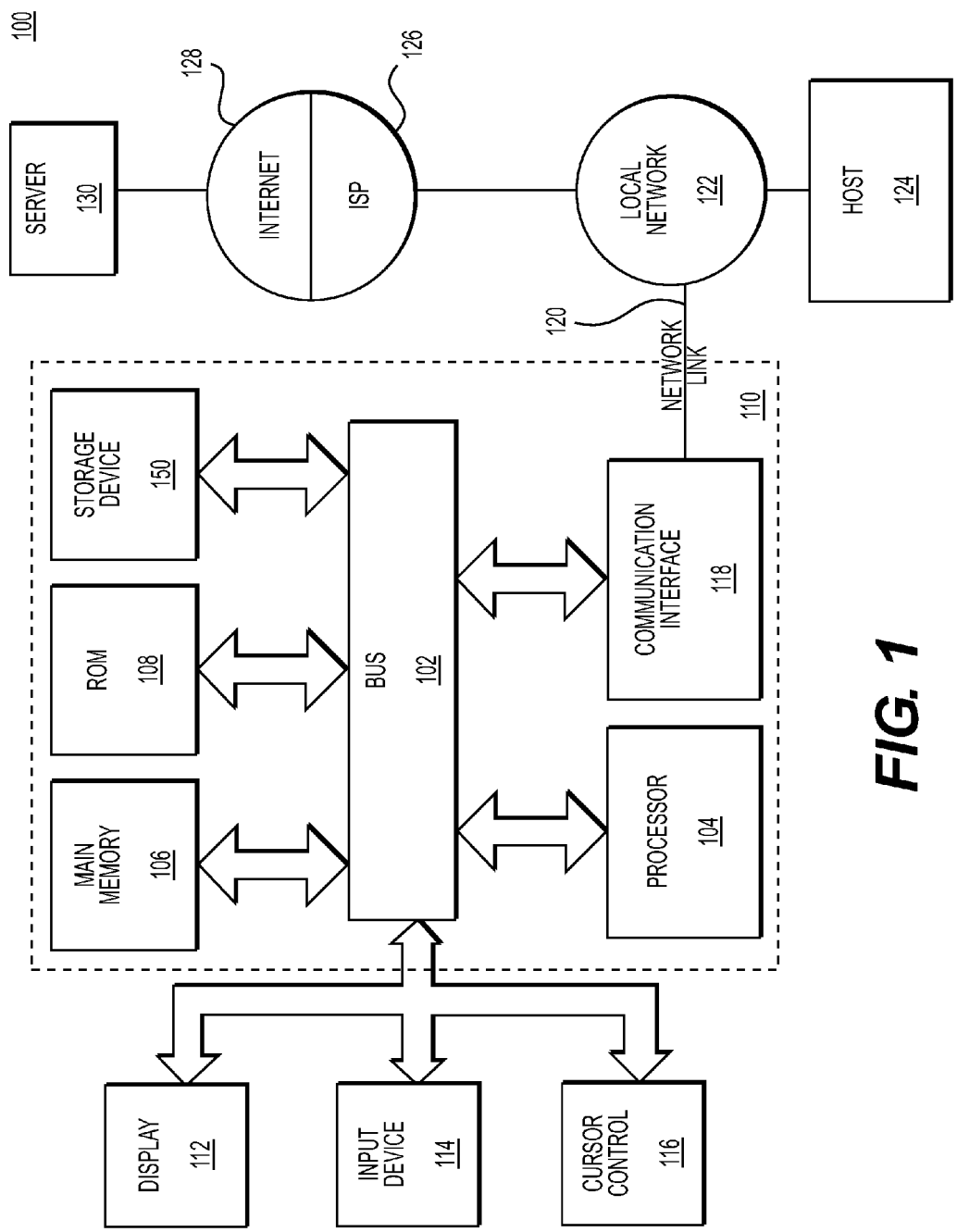
FIG. 1 is a block diagram of an exemplary system, consistent with embodiments of the present disclosure.

Reference will now be made in detail to several exemplary embodiments of the present disclosure, including those illustrated in the accompanying drawings. Whenever possible, the same reference numbers will be used throughout the drawings to refer to the same or like parts.

Embodiments disclosed herein are directed to, among other things, computer-implemented systems and methods for data management and visualization. The disclosed embodiments provide novel techniques for users to select, weigh, manipulate, and visualize data. The disclosed embodiments also provide an integrated solution that is scalable, flexible, and customizable for each user's needs.

In accordance with some embodiments, systems and methods are provided for data management and visualization. With such systems and methods, a user may manage the storage of data from one or more sources. Data may be added, deleted, modified and/or otherwise manipulated, such as by geographic areas of interest or date range(s). Data weighting and scoring may also be performed. In some embodiments, data weights may be assigned by a user, along with characteristics or other parameters for computing scores. Additionally, in some embodiments, a user may select to view the data in one or more visualization formats, such as in a map, a table, a chart, and/or other format(s).

Embodiments of the present disclosure may be implemented to allow users to manage and visualize data on a geographic or location basis. In such embodiments, a user may specify which characteristics are important for analyzing individual locations and view the data in one or more formats in order to easily compare multiple locations with one another on the basis of those characteristics. In addition, as further disclosed herein, a set of metrics may be specified by a user as well as the weights to be applied to each metric for purposes of analysis. The metrics, weights, and characteristics may all be adjustable and user-defined to allow complete flexibility and customization.

In some embodiments, systems and methods are provided that store data from one or more sources, the data being associated with a plurality of locations. The systems and methods also receive, from a user, an identification of a set of metrics derivable from the stored data and a weight to be assigned to each metric. In addition, the systems and methods calculate, for each of the plurality of locations, a score for each identified metric, apply the corresponding weight to the score for each identified metric, and calculate, for each of the plurality of locations, an overall score based on a sum of the weighted scores for each location. Furthermore, the systems and methods can provide instructions to present a display to the user, the display including a representation of the overall score and other corresponding data for each location. In some embodiments, the user may also be provided with input elements on the display to adjust, for example, the assigned weights and visualize the impact those changes have on the scores and/or other data for each location.

As will be appreciated from the present disclosure, the exemplary systems and method described herein may be implemented to analyze data on a geographic or location basis. Such an analysis may be done for a variety of purposes. In one exemplary embodiment provided herein, data is managed and visualized for purposes of identifying a potential area to live or purchase a home. Of course, the embodiments of the present disclosure are not limited to this exemplary implementation, and can be implemented and used for a wide variety of purposes. For example, the disclosed embodiments may be used by a business to determine a location for a new office or factory, by a student to determine which college to attend, or by an organization to determine where to host an event.

According to some embodiments, the operations, techniques, and/or components described herein can be tangibly implemented by a system, which can include one or more special-purpose computing devices. The special-purpose computing devices can be hard-wired to perform the operations, techniques, and/or components described herein, or can include digital computing devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems control and schedule computer processes for execution, perform memory management, provide file system, networking, I/O services, and provide a user interface functionality, such as a graphical user interface ("GUI"), among other things.

By way of example, FIG. 1 is a block diagram that illustrates an implementation of an exemplary system 100, which, as described above, can comprise one or more special-purpose computing devices. As will be appreciated from this disclosure, the exemplary embodiment of FIG. 1 is provided for purposes of illustration. The number and arrangement of components in system 100 may be modified or adjusted without departing from the teachings of the present disclosure.

As illustrated in FIG. 1, system 100 includes a computing device 110 that includes a bus 102 or other communication mechanism for communicating information, and one or more hardware processors 104, coupled with bus 102 for processing information. The one or more hardware processors 104 can be, for example, one or more microprocessors.

Computing device 110 also includes a main memory 106, such as a random access memory (RAM) or other dynamic storage device, coupled to bus 102 for storing information and instructions to be executed by processor 104. Main memory 106 also can be used for storing temporary variables or other intermediate information during execution of instructions to be executed by processor 104. Such instructions, when stored in non-transitory storage media accessible to one or more processors 104, render computing device 110 into a special-purpose machine that is customized to perform the operations specified in the instructions.

Computing device 110 further includes a read only memory (ROM) 108 or other static storage device coupled to bus 102 for storing static information and instructions for processor 104. A storage device 150, such as a magnetic disk, optical disk, or USB thumb drive (Flash drive), etc., is provided and coupled to bus 102 for storing information and instructions.

Computing device 110 can be coupled via bus 102 to a display 112, such as a cathode ray tube (CRT), an LCD display, or a touchscreen, for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computing device 110 can include a user interface module to implement a GUI that may be stored in a mass storage device as executable software codes that are executed by the one or more computing devices. This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C, and C++. A software module can be compiled and linked into an executable program, installed in a dynamic link library, or written in an interpreted programming language such as, for example, BASIC, Perl, Python, or Pig. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that may be combined with other modules or divided into sub-modules despite their physical organization or storage.

Computing device 110 can implement the techniques and other features described herein using customized hard-wired logic, one or more ASICs or FPGAs, firmware and/or program logic which in combination with the computing device causes or programs computing device 110 to be a special-purpose machine. According to some embodiments, the techniques and other features described herein are performed by computing device 110 in response to one or more processors 104 executing one or more sequences of one or more instructions contained in main memory 106. Such instructions can be read into main memory 106 from another storage medium, such as storage device 150. Execution of the sequences of instructions contained in main memory 106 causes processor 104 to perform the process steps described herein. In alternative embodiments, hard-wired circuitry can be used in place of or in combination with software instructions.

The term "non-transitory media" as used herein refers to any media storing data and/or instructions that cause a machine to operate in a specific fashion. Such non-transitory media can comprise non-volatile media and/or volatile media. Non-volatile media includes, for example, optical or magnetic disks, such as storage device 150. Volatile media includes dynamic memory, such as main memory 106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media can be involved in carrying one or more sequences of one or more instructions to processor 104 for execution. For example, the instructions can initially be carried on a magnetic disk or solid state drive of a remote computer. The remote computer can load the instructions into its dynamic memory and send the instructions over a telephone line using a modem. A modem local to computing device 110 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 can optionally be stored on storage device 150 either before or after execution by processor 104.

Computing device 110 also includes a communication interface 118 coupled to bus 102. Communication interface 118 provides a two-way data communication coupling to a network link 120 that is connected to a local network 122. For example, communication interface 118 can be an integrated services digital network (ISDN) card, cable modem, satellite modem, or a modem to provide a data communication connection to a corresponding type of telephone line. As another example, communication interface 118 can be a local area network (LAN) card to provide a data communication connection to a compatible LAN. Wireless links can also be implemented. In any such implementation, communication interface 118 sends and receives electrical, electromagnetic or optical signals that carry digital data streams representing various types of information.

Network link 120 typically provides data communication through one or more networks to other data devices. For example, network link 120 can provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computing device 110, are example forms of transmission media.

Computing device 110 can send messages and receive data, including program code, through the network(s), network link 120 and communication interface 118. In the Internet example, a server 130 might transmit a requested code for an application program through Internet 128, ISP 126, local network 122 and communication interface 118. The received code can be executed by processor 104 as it is received, and/or stored in storage device 150, or other non-volatile storage for later execution. In addition, computing device 110 may receive data from a plurality of sources using network link 120 and communication interface 118. The data sources may include personal and corporate databases, as well as professional or commercial data sources. Such data may be transmitted via the Internet or other network(s) and stored locally at computing device 110, or may be hosted remotely (e.g., in a cloud arrangement) and accessed as needed by computing device 110 to perform the methods, techniques, and other features of the present disclosure.

Figure 2:
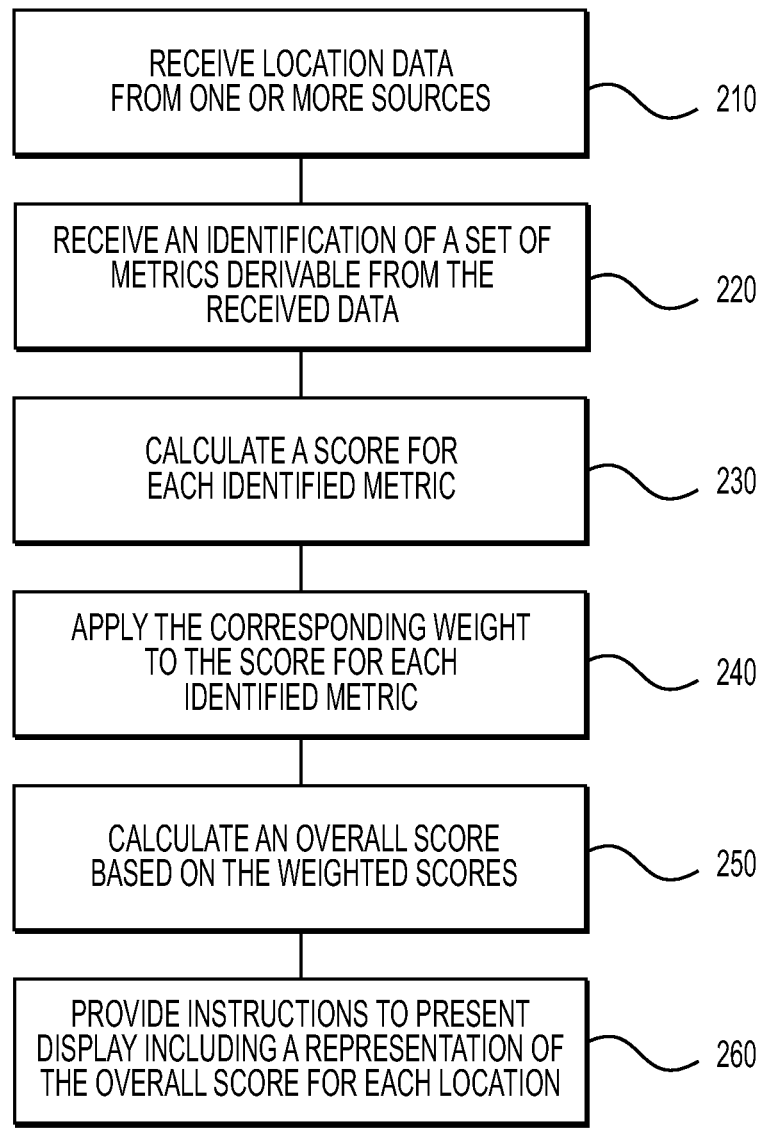
FIG. 2 is a flowchart of an exemplary method for managing and visualizing data, consistent with embodiments of the present disclosure.

FIG. 2 shows a flowchart representing an exemplary method 200 for managing and visualizing data, consistent with embodiments of the present disclosure. In some embodiments, method 200 can be performed by a client application (e.g., a web browser, a plug-in to a web browser, a standalone executable application, etc.) running on a client device, by a server (e.g., a web server), or it can have some steps or parts thereof executed on the client device, and some steps or parts thereof executed on the server. Thus, method 200 can be performed with, for example, system 100 including one or more computing devices 110, as described above with reference to FIG. 1. Further, while method 200 and other embodiments described herein can be performed by multiple computing devices, each having one or more processors, for purposes of illustration and without limitation, method 200 and other features will be explained herein with respect to a single computing device (e.g., computing device 110). Moreover, while the flowchart discloses the following steps in a particular order, it is appreciated that at least some of the steps can be moved, modified, or deleted where appropriate, consistent with the teachings of the present disclosure.

Referring to FIG. 2, at step 210, the computing device receives data from one or more sources, the data being associated with a plurality of locations. In one embodiment, the computing device receives data associated with a plurality of locations that may be used to analyze the desirability of a location for a particular need or purpose. For example, the received data may include data describing the population, median income, cost of living, unemployment rate, average education level, crime level, school ratings, and tax rate associated with each location. The computing device can receive the data from various sources, including those local to or remote from the computing device.

Examples of such sources include a local memory or database, or an external memory or database. For instance, as part of step 210, the computing device can receive data over the Internet from third-party sources, such as government sources (e.g., U.S. Census Bureau), open sources (e.g., Wikipedia), and/or private sources (e.g., GreatSchools).

The received data may be associated with a plurality of locations, each of which in turn is associated with one or more types of geographical units. A geographical unit may include, for example, a unit that delineates a geographical area, such as a set of latitude and longitude coordinates, street address, zip code, school district, city, county, congressional district, state, and country. In one embodiment, the computing device can receive a selection of one or more locations from a user. For example, a user may identify three addresses corresponding to homes the user is considering purchasing or areas where the user is considering living, such that the user can compare various metrics associated with those addresses. Alternatively, the user may choose to analyze all locations within a specified region. For example, the user may select to analyze all zip codes within 45 miles of a city or town to define the scope of relevant data for analysis. In one embodiment, the received data may correspond to data suitable for a chloropleth map. In another embodiment, the received data may be a richer set of data suitable for a geosearch, including, for example, geocoordinates associated with each zip code.

In one embodiment, the computing device manages or allocates the received data to correspond to a geographic unit selected by a user. For example, if the user selects to compare five counties, but certain data received by the computing device is organized according to larger or smaller geographic units, the computing device can allocate the received data by county. In other words, if the user wants to compare the cost of living in five counties, but the computing device only receives cost of living data at the city level, then the computing device will compute the cost of living data for each county based on the cost of living data for each city within each of the selected counties (e.g., weighted average based on population of constituent cities).

At step 220, the computing device receives an identification of a set of metrics derivable from the received data. For example, based on input from the user, the user may indicate that he/she wants to compare locations within a specified region in which to purchase a home based on three metrics: school ratings, cost of living, and median income. This input may be used by the computing device to identify or compute the corresponding data from the received data. In some cases, the data may be directly identified from the received data (i.e., it already exists in the desired form of metric), while in other cases the computing device may transform, extract or compute the desired metric from the received data by applying one or more rules and/or data techniques. For example, if the computing device receives cost of living data at the city level, but the user would like to see cost of living data on the county level, then the computing device may compute the cost of living data on the county level by calculating a weighted average for the county based on the cost of living and relative population of the cities within the county, as discussed above. Moreover, the computing device may transform historical data, such as data associated with obsolete zip codes or zip codes that have changed boundaries, to updated data (e.g., by associating an old zip code with a new set of latitude/longitude coordinates or county). As another example, the computing device may receive data associated with latitude/longitude coordinates. If the user requests to review the data by zip code, then the computing device may obtain an identification of latitude/longitude coordinates (e.g., coordinate ranges) associated with the zip code and calculate a representation of the data (e.g., total, average, weighted average, median) for the entire zip code. In one embodiment, the received data may be received in one unit (e.g., a specific currency or form of measurement) and transformed into another unit in response to a user request. For example, if the user wants to see the average price per square foot for a property, but the computing device receives data regarding the average price of a property on a per-acre basis, then the computing device may transform the received data to reflect the unit selected by the user (e.g., by dividing the average price by 43,560).

In some embodiments, each of the metrics is associated with a weight. The weight may be identified by a user as part of step 220 and indicate the importance that the user attaches to each metric. For example, the weight may be a value between 0 and 100, wherein 0 represents the lowest weight that may be associated with a metric and 100 represents the highest weight that may be associated with a metric. The user may assign each metric may be assigned a separate weight based on input from a user. In one embodiment, the user may assign a metric a weight using a slider bar associated with the metric to move the position of an indicator on the slider bar to the appropriate value. Alternatively, the user may assign weights to metrics using a text input box, drop-down menu, or any other form of input.

In one embodiment, the computing device can store preset values for metrics and/or associated weights. For example, a user may store as a metric preset an identification of a set of metrics that the user considers important for evaluating a location. Thus, each time the user wants to analyze and compare locations, the user can select the metric preset, rather than separately identifying each of the metrics comprising the metric preset. In one embodiment, the user may also store in the metric preset weights associated with each of the metrics. In another embodiment, metric presets may be provided based on, for example, a user type or profile, or evaluation scenario. For example, different sets of metric presets may be defined for different types of people looking to purchase a home, such as a single person, a married couple without children, a family with young children, etc., as each of these types of people may typically focuses on different metrics when searching for a place to live.

At step 230, the computing device can, for each of the plurality of locations, calculate a score for each identified metric. Accordingly, each location may be associated with a plurality of scores, each score corresponding to one of the identified metrics for that location. Thus, in the previous example, each zip code in the specified region would be assigned a separate score for each of the identified metrics. More specifically, in that example, each location would be assigned three scores—one for school ratings, one for cost of living, and one for median income. Each score may fall within a range of permissible scores, such as a range of 0 to 100, with 0 being the lowest possible score for a metric and 100 being the highest possible score for a metric. Thus, in this embodiment, if three metrics are analyzed for each location, the highest overall score for a location (assuming each is weighted at 100%) is 300. Alternatively, the overall scores for a location may range from 0 to 100, with each metric contributing equally. For example, if there are four identified metrics, each would be weighted at 25%.

In some embodiments, a metric may be evaluated based on one or more characteristics specified by a user. For example, the user may identify at least one characteristic for evaluating one or more of the selected metrics. For instance, the user may specify that she wants the displayed school rating associated with each zip code to be based on a teacher-student ratio, per pupil spending, or graduation rate, or a combination of these characteristics. Thus, in one embodiment, calculating a score for a metric may include evaluating the metric in light of the one or more specified characteristics. For example, if the user specifies that she wants the school ratings score assigned to each location to reflect the teacher-student ratio and graduation rate in the location, the computing device can calculate the score for the school ratings metric based on those two characteristics. In one embodiment, the same characteristics are used to calculate the score for the metric with respect to each location.

At step 240, the computing device can, for each of the plurality of locations, apply the corresponding weight to the score for each identified metric. In one embodiment, the computing device applies the associated weight for a metric to its score by multiplying the score by a value determined based on the associated weight (e.g., the weight divided by 100). For example, if the user indicates that the weight for a metric should be 80, then the score for the metric may be multiplied by 0.80.

At step 250, the computing device can, for each of the plurality of locations, calculate an overall score based on the weighted scores. In one embodiment, the computing device calculates an overall score for a location by summing each of the weighted scores for the location. Additionally, or alternatively, the computing device can calculate an overall unweighted score for a location by summing each of the unweighted scores for the location.

At step 260, the computing device provides instructions to present a display to the user that includes, among other things, a representation of the overall score for each location. The type of display may be selectable and/or customizable by a user. For example, in one embodiment, the computing device can display a map comprising a representation of the overall weighted score for each location. In this embodiment, the representation of the overall weighted score may include, for example, a color-coded representation of each location. For example, if a user selects to analyze all counties in a metropolitan area based on three metrics, the overall weighted scores for each of those counties may be represented on a map using a color-coding scheme, whereby the county is drawn on the map in a color corresponding to its score (e.g., green for a high score, yellow for a moderate score, red for a low score). In some embodiments, the user may specific what colors may be used to represents various scores and/or the thresholds for determine what constitutes a high, moderate, or low score.

In one embodiment, the computing device may also provide instructs to present a display including a table comprising a representation of the overall weighted score for each location. In this embodiment, the representation of the overall weighted score for each location may include text that indicates the value of the overall weighted score. The table may also include, for each location, a color-coded image or symbol representing the weighted score. In one embodiment, the computing device can also display each of the metrics, characteristics, characteristic values, raw scores, ranks, weights, and weighted scores for each location. Moreover, in one embodiment, the user may manipulate the table such that information for each location is displayed, for example, based on the overall weighted or unweighted score for each location or the weighted or unweighted score for each location for a given metric.

In one embodiment, the computing device can receive an identification of a date or date range. For example, the user may indicate that she would like the analysis of the locations to be based on data from a certain day, month, year, or range of days, months, or years. Further, in one embodiment, the computing device can calculate a score for each identified metric based on data pertaining to the identified metric for the identified date or date range. For example, the computing device can calculate scores for each identified metric based on data collected for those metrics in the year 2000, weight those scores, and determine an overall weighted score for each location based on data from 2000.

In one embodiment, the computing device can receive an indication of a modified date or date range. For example, the user may indicate another day, month, year, or range of days, months, or years. The computing device can calculate a modified score for each identified metric based on data pertaining to the identified metric for the modified date or date range. The computing device can apply to the modified score for each identified metric, the associated weight for the metric and calculate a modified overall score based on the weighted modified scores. In one embodiment, the computing device can compare the overall score for a location based on an original or previously identified date or date range to the modified overall score for the location corresponding to the modified date or date range. This can enable users to determine how the desirability of a location changes over time (e.g., whether a location is trending positively or negatively), which may indicate, for example, whether the values of homes in the location are likely to rise or fall. In one embodiment, changes in the overall score for a location, as well as changes to the individual metrics for the location, may be presented in a line graph view to enable a user to see how the metric(s) and overall score for that location have changed over time.

In one embodiment, a date or date range may be specified using a timeline slider bar. For example, the computing device can provide instructs to present a display to a user including a color-coded map comprising a plurality of counties comprising a metropolitan area. The computing device can also display concurrently with the map a timeline slider bar indicating a range of years (e.g., 1990-2015). The user may specify a date by clicking within the timeline slider bar on the desired year for analysis. Alternatively, the user may specify a date range by placing one indicator at the beginning of the range and another indicator at the end of the date range. In one embodiment, when the user specifies a date or date range using the timeline slider bar, the computing device, for each of the plurality of locations, calculates a score the each identified metric, applies to the score for each identified metric the associated weight for the identified metric, and calculates an overall weighted score based on the weighted metric scores. The computing device can then display a representation of the overall weighted score for each location, such as by updating the color-coding for the counties displayed on the map to reflect the overall weighted scores for each county for the selected date or date range. Thus, by moving an indicator (or pair of indicators for a date range) forward and backward on the timeline slider bar, the user may see how the desirability of a location is changing over time.

Features that enable scalability may also be provided. For example, in one embodiment, the computing device can receive the identification of one or more additional metrics from a user. Each additional metric may be associated with an additional weight specific to that metric. The computing device can, for each of the plurality of locations, calculate a score for an additional metric, apply to the score for the additional metric the associated additional weight, and recalculate the overall weighted score based on the weighted metric scores for the location. The computing device can also display a representation of the recalculated overall weighted score for each location. Thus, the computing device can enable the user to add additional metrics to the existing metrics for evaluating locations and determine how the consideration of the additional metrics affects the desirability of the locations. It will also be appreciated that metrics may be removed by a user, with the scores for each location being recomputed and displayed by the computing device, so that the user can consider how the removal of one or more metrics impacts the comparison of locations.

In still further embodiments, the computing device can modify the weight associated with one of the metrics based on input from a user. For example, the user may move an indicator on a metric slider bar to raise or lower the weight associated with the metric. In response, the computing device can, for each of the plurality of locations, apply the modified weight to the score for the one of the metrics (i.e., the metric associated with the modified weight) and recalculate the overall weighted score based on the weighted metric scores, including the newly modified weighted metric score and the previously weighted metric scores. The computing device can also cause the display of a representation of the overall weighted score for each location. Thus, the user can see how adjusting the weights applied to one or more of the selected metrics changes the overall weighted score for each location.

Figure 3:
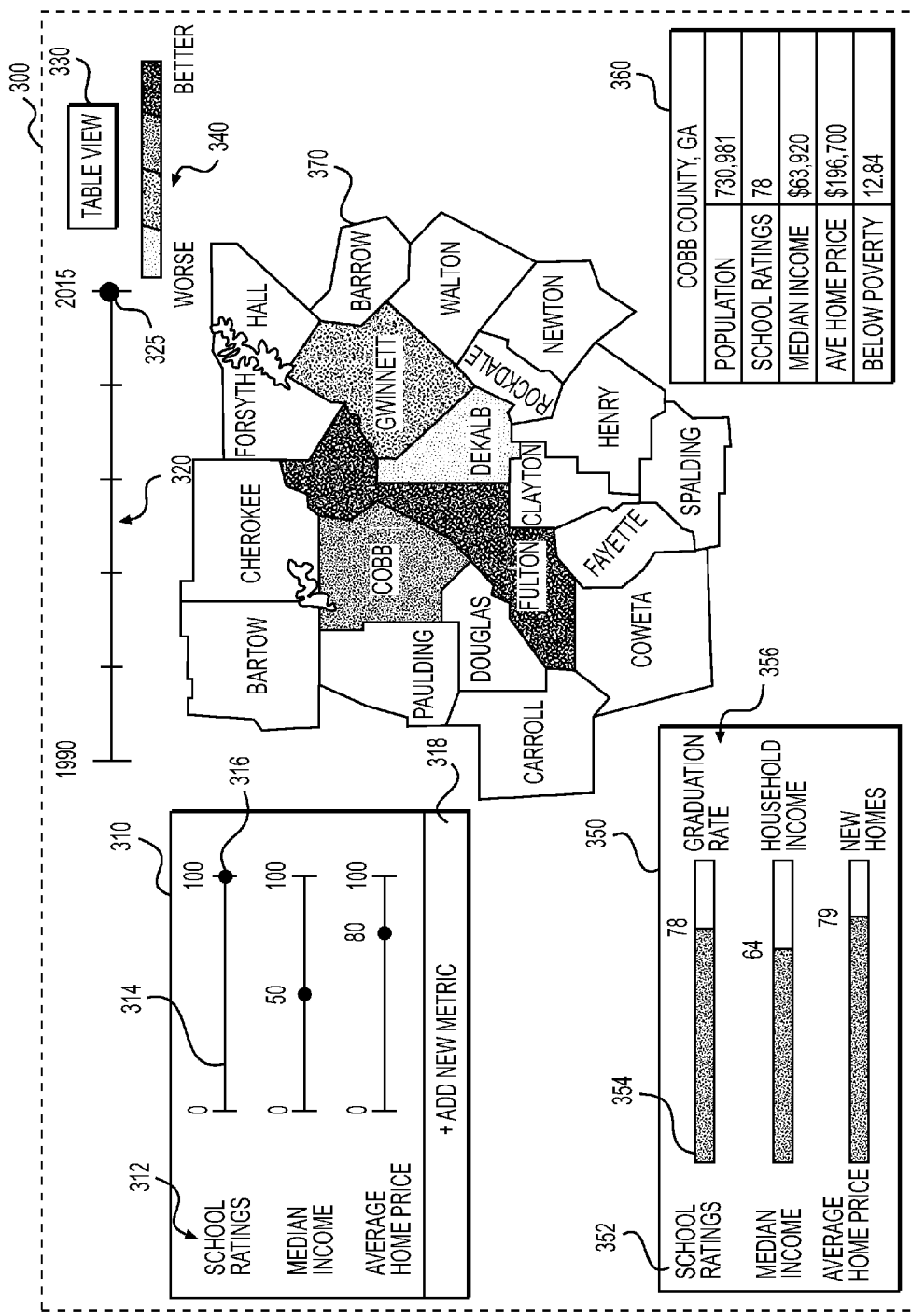
FIG. 3 illustrates an exemplary user interface, consistent with embodiments of the present disclosure.

FIG. 3 illustrates an exemplary user interface 300, consistent with embodiment of the present disclosure. User interface 300 illustrates an example of a display generated by the computing device (e.g., computing device 110) that can be implemented on device (e.g., display 112) for viewing by a user. Interface 300 can assist the user to visualize the desirability of a plurality of locations on a map. In the exemplary embodiment of FIG. 3, interface 300 includes a metric selector 310, timeline slider bar 320, table view button 330, legend 340, score display 350, statistics display 360, and map 370. Each of these graphical elements is described in greater detail below. It will be understood from this disclosure that the number and arrangement of these elements is exemplary and that modifications can be made, consistent with the present disclosure.

Metric selector 310 may display a representation of the metrics selected by a user for use in analyzing one or more locations. Metric selector 310 may include metric names 312, metric slider bars 314, weight indicators 316, and add new metric button 318. Metric names 312 are the names of the metrics selected by a user for analyzing the locations. Metric slider bars 314 may be used to assign weights to the selected metrics. In the exemplary interface shown in FIG. 3, the selected metrics being analyzed are school ratings, median income, and average home price, and the weights associated with those metrics are 100, 50, and 80, respectively.

A user may select add new metric button 318 to add a new metric to the list of metrics used to analyze the locations. In one embodiment, selecting add new metric 318 will cause the computing device to display a window or other prompt with a listing of potential metrics according to which locations may analyzed. User selection of a new metric will add the metric to metric selector 310. The user may then assign a weight to the new metric by adjusting the weight indicator 316 along the metric slider bar 314 associated with the new metric. In one embodiment, adding a new metric and/or associating a new weight with the new metric can cause the computing device to recalculate the overall scores for each of the locations and update the map display.

Timeline slider bar 320 may be used to select a date or date range from which data pertaining to the selected metrics should be collected. Accordingly, timeline slider bar 320 includes a date indicator 325 for selecting a date or date range. In the exemplary interface shown in FIG. 3, the selected date or year is 2015. Thus, the data used to determine the desirability of the locations displayed in map 370 will be the data collected pertaining to the selected metrics in 2015. In one embodiment, if a user selects a new date or date range, such as by moving date indicator 325 to a different location on timeline slider bar 320, the computing device will recalculate the scores for each metric based on data from the new date or date range, reapply the weights, recalculate the overall weighted scores for each location, and update the map display.

Interface 300 also includes a table view button 330 and legend 340. A user may select table view button 330 to change the current view of the displayed location information from the map view (shown in FIG. 3) to the table view (shown in FIG. 4). Legend 340 explains the meaning of the color-coding scheme used in map 370. For example, in FIG. 3, legend 340 indicates that less desirable locations are lightly shaded and more desirable locations are more heavily shaded.

Score display 350 may display the raw (i.e., unweighted) scores for each of the locations for a selected location. Score display 350 may include metric names 352, scores 354, and characteristics 356. In one embodiment, score display 350 may display data pertaining to the same metrics as selected and displayed via metric selector 310. Thus, metric names 352 may be the same as metric names 312. Characteristics may identify the characteristics according to which the scores 354 were determined for each of metrics 312. In the exemplary interface shown in FIG. 3, the score display 350 indicates that the school ratings score is based on graduation rates, the median income score is based on household income and the average home price is based on the median price of new homes. Scores 354 display the scores for a selected location associated with each metric 352. In one embodiment, scores 354 may be scaled (e.g., to a value between 0 and 100), such that they may be more easily weighed and analyzed with one another. For example, a median income of $63,920 may be converted to a score of 64/100 by multiplying the median income by 0.001. Alternatively, scores 354 may be scaled by converting them to their percentile rank among all locations within a displayed region or all possible locations. In one embodiment (not shown), scores 354 may include two indicators (e.g., along a bar): one for the unweighted score for a metric and another for the weighted score for the metric.

Statistics display 360 may display the name of a selected location and several statistics corresponded to the selected location. In one embodiment, the displayed statistics may include each of the metrics selected by the user. The displayed statistics may also include addition (e.g., default) statistics. In one embodiment, the user may determine which statistics are displayed in statistics display 360, including which statistics are displayed by default and whether all metrics currently under evaluation should be displayed. In the exemplary interface shown in FIG. 3, each of the selected metrics (i.e., school ratings, median income, and average home price) is displayed in statistics display 360, along with two addition metrics—population and percentage of population below the poverty line.

Map 370 displays a map corresponding to one or more of the analyzed locations. In one embodiment, map 370 includes a region comprising all locations being analyzed. In another embodiment, map 370 may display only a subset of the locations being analyzed (e.g., if the user zooms in on one or more locations). In one embodiment, each of the locations is color-coded based on the overall weighted or unweighted score of the location. Moreover, in one embodiment, if a user selects one of the locations (e.g., by clicking on the map), the computing device can update score display 350 and statistics display 360 to reflect the scores and statistics, respectively, for the selected location. The computing device can also update map 370, score display 350, and statistics display 360 in response to the user adding/removing a metric, adjusting the weight of a metric, or adjusting the selected date.

Figure 4:
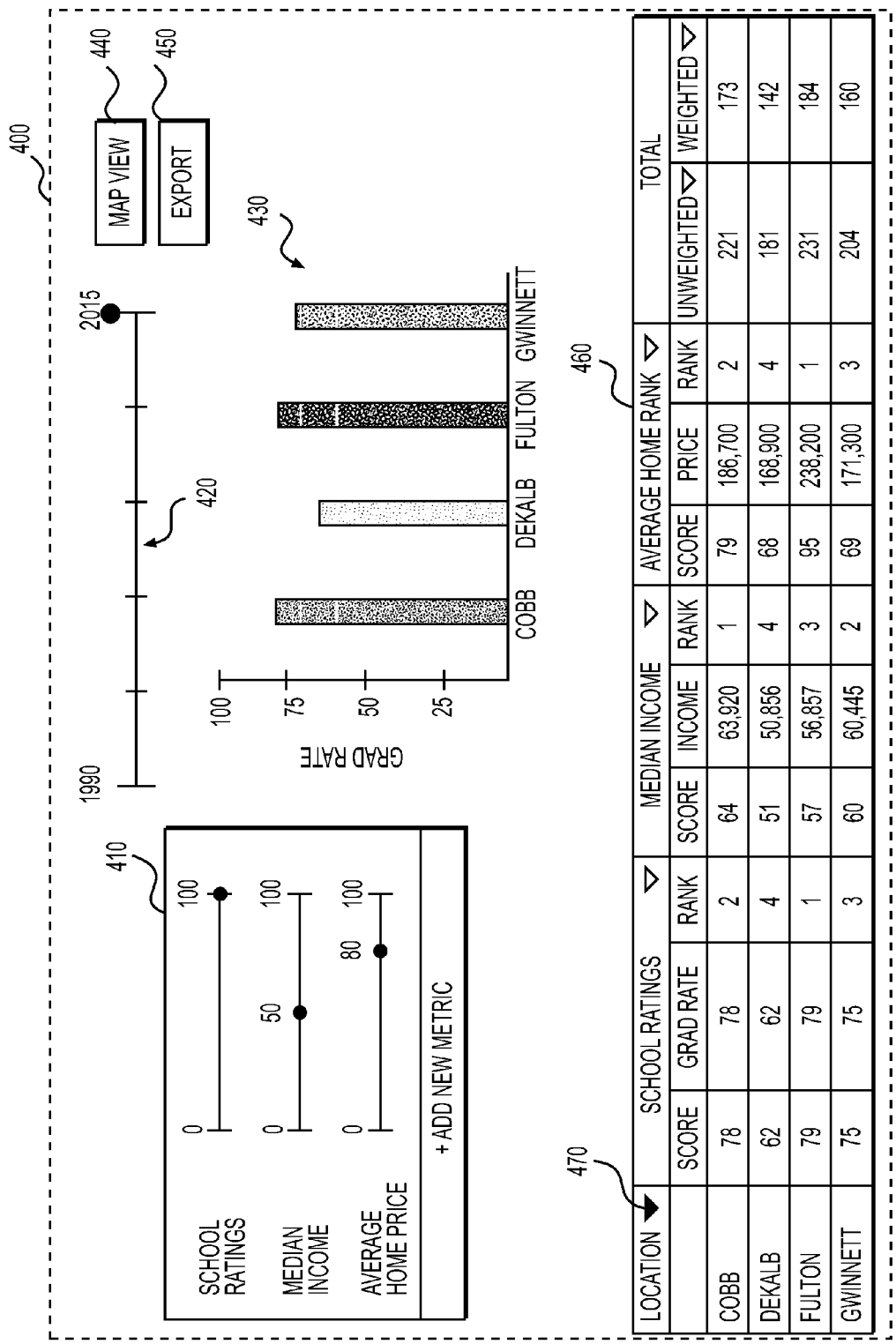
FIG. 4 illustrates another exemplary user interface, consistent with embodiments of the present disclosure.

FIG. 4 illustrates another exemplary user interface 400, consistent with embodiment of the present disclosure. User interface 400 illustrates another example of a display that can be generated by the computing device (e.g., computing device 110) for viewing on a device (e.g., display 112) by a user. Interface 400 can assist a user to view metric data for various locations in a consolidated table. As shown in FIG. 4, interface 400 may include a metric selector 410, timeline slider bar 420, graph 430, map view button 440, export button 450, graph 460, and order buttons 470. Each of these elements are described in greater detail below. It will be understood from this disclosure that the number and arrangement of these elements is exemplary and that modifications can be made, consistent with the present disclosure.

Metric selector 410 may include the same components and provide the same functionality as metric selector 310. In one embodiment, if a user adds a new metric or adjusts the weight of an existing metric using metric selector 410, table 460 may be updated to reflect the new metric or new weighted total score. Timeline slider bar 420 may include the same components and provide the same functionality as timeline slider bar 320. In one embodiment, if a user adjusts the date indicator on timeline slider bar 420, graph 430 and table 460 may be updated to reflect the data for the selected date or date range. Graph 430 may display data for one or more locations corresponding to a selected metric in graph format.

A user may select the map view button 440 to cause the computing device to display interface 300. A user may select the export button 450 to cause the computing device to export the data displayed in table 460. For example, the computing device can export the data displayed in table 460 to a workbook (i.e., spreadsheet) format, comma-separated value format, text format, or any other format appropriate for the display of table data.

Table 460 may display consolidated data for one or more metrics and locations. In the example shown in FIG. 4, table 460 displays data corresponding to three selected metrics (i.e., school ratings, median income, and average home price) for four metropolitan Atlanta counties. Each of the metrics is further broken into an unweighted score for the characteristic(s) according to which the metric is being analyzed, raw characteristic value(s) (i.e., values for graduation rate, income, and price), and a rank. In one embodiment, the raw characteristic value is the value corresponding to a characteristic according to which the metric is analyzed, which may be based on a user selection, as discussed above. The score for each metric may be computed based on the raw characteristic value(s). In one embodiment, the score and the raw characteristic value(s) for a metric may be the same, such as when there is only one raw characteristic value and it is based on a scale of 0-100. In another embodiment, the raw characteristic value(s) may be averaged and/or scaled to a value between 0-100 to determine the score, such as by multiplying each raw characteristic value for a metric by the same factor. The rank may indicate the rank of a location for the metric.

In one embodiment, table 460 includes a total unweighted score and a total weighted score for each location. The total unweighted score may include the sum of the unweighted scores (i.e., the displayed scores) for each metric. The total weighted score may include the sum of the weighted scores (not displayed) for each metric, each of which may be calculated by multiplying the unweighted score for the metric by a factor set using metric selector 410. In one embodiment, the information displayed in table 460 may be ordered by location, a metric, total unweighted score, or total weighted score. The user may select the value on which ordering is based using order buttons 470. In the example shown in FIG. 4, the information displayed in table 460 is ordered alphabetically by location.

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the present disclosure being indicated by the following claims. It is also intended that the sequence of steps shown in figures are only for illustrative purposes and are not intended to be limited to any particular sequence of steps. As such, it is appreciated that these steps can be performed in a different order while implementing the exemplary methods or processes disclosed herein.

What is claimed is:

1. A computer-implemented system for data management and visualization, comprising:
   one or more computer-readable storage media that store instructions; and
   one or more processors that execute the instructions to configure the one or more processors to:
      receive data from one or more sources, the data being associated with a plurality of locations;
      receive, based on input from a user, a selection of a set of metrics from a displayed listing of potential metrics for scoring each of the plurality of locations and a weight to assign to each metric;
      receive, based on input from the user, an identification of a date range; and
      calculate an overall score for each of the plurality of locations based on data pertaining to the selected metrics for the identified date range and the weight assigned to each metric.

2. The system of claim 1, wherein each of the plurality of locations is associated with a geographical unit type selected from the group comprising a zip code, a school district, a city, a county, a congressional district, a state, and a country.

3. The system of claim 2, wherein the one or more processors are further configured to execute the instructions to:
   receive an identification of a geographical unit type,
   wherein the plurality of locations are of the identified geographical unit type.

4. The system of claim 1, wherein the one or more processors are configured to calculate an overall score for each of the plurality of locations by performing steps for each of the plurality of locations comprising:
- calculating a score for each selected metric;
- applying the corresponding weight to the score for each selected metric; and
- calculating the overall score based on the sum of the weighted scores for each location.

5. The system of claim 4, wherein the one or more processors are further configured to execute the instructions to:
- receive an identification of a characteristic for evaluating at least one of the selected metrics; and
- calculate the score for the at least one selected metric based on the identified characteristic.

6. The system of claim 4, wherein the one or more processors are further configured to execute the instructions to:
- modify the weight associated with at least one of the metrics; and
- for each of the plurality of locations:
  - apply the modified weight to the score for the at least one of the metrics; and
  - recalculate the overall score based on the weighted scores.

7. The system of claim 1, wherein the one or more processors are further configured to execute the instructions to:
- receive an identification of a modified date range; and
- for each of the plurality of locations:
  - calculate a modified score for each selected metric based on data pertaining to the selected metric for the modified date range;
  - apply to the modified score for each identified metric the associated weight; and
  - calculate a modified overall score based on the weighted modified scores.

8. The system of claim 1, wherein the one or more processors are further configured to execute the instructions to present a display to the user including a representation of the overall score for each location.

9. The system of claim 8, wherein the one or more processors are further configured to execute the instructions to present, as part of the display to the user, a map comprising a representation of the overall score for each location.

10. The system of claim 8, wherein the one or more processors are further configured to execute the instructions to present, as part of the display to the user, a table comprising a representation of the overall score for each location.

11. The system of claim 1, wherein the one or more processors are further configured to execute the instructions to:
- receive, based on input from the user, a selection of an additional metric and an additional weight to assign to the additional metric; and
- for each of the plurality of locations:
  - calculate a score for the additional metric;
  - apply to the score for the additional metric the associated additional weight; and
  - recalculate the overall score based on the weighted scores for the location.

12. A computer-implemented method performed by one or more processors and comprising:
- receiving data from one or more sources, the data being associated with a plurality of locations;
- receiving, based on input from a user, a selection of a set of metrics from a displayed listing of potential metrics for scoring each of the plurality of locations and a weight to assign to each metric;
- receiving, based on input from the user, an identification of a date range; and
- calculating an overall score for each of the plurality of locations based on data pertaining to the selected metrics for the identified date range and the weight assigned to each metric.

13. The method of claim 12, further comprising providing instructions to present a display to a user including a representation of the overall score for each location.

14. The method of claim 13, further comprising presenting, as part of the display to the user, a map comprising a representation of the overall score for each location.

15. The method of claim 13, further comprising presenting, as part of the display to the user, a table comprising a representation of the overall score for each location.

16. A non-transitory computer-readable medium storing a set of instructions that are executable by one or more processors to cause the one or more processors to perform operations comprising:
- receiving data from one or more sources, the data being associated with a plurality of locations;
- receiving, based on input from a user, a selection of a set of metrics from a displayed listing of potential metrics for scoring each of the plurality of locations and a weight to assign to each metric;
- receiving, based on input from the user, an identification of a date range; and
- calculating an overall score for each of the plurality of locations based on data pertaining to the selected metrics for the identified date range and the weight assigned to each metric.

17. The non-transitory computer-readable medium of claim 16, further comprising instructions executable by the one or more processors to cause the one or more processors to provide instructions to present a display to a user including a representation of the overall score for each location.

18. The non-transitory computer-readable medium of claim 17, further comprising instructions executable by the one or more processors to cause the one or more processors to provide instructions to present, as part of the display to the user, a map comprising a representation of the overall score for each location.

19. The non-transitory computer-readable medium of claim 17, further comprising instructions executable by the one or more processors to cause the one or more processors to provide instructions to present, as part of the display to the user, a table comprising a representation of the overall score for each location.

* * * * *